US 6,724,006 B2

(12) United States Patent
Ogawa

(10) Patent No.: US 6,724,006 B2
(45) Date of Patent: Apr. 20, 2004

(54) SOLID STATE RADIATION DETECTOR

(75) Inventor: Masaharu Ogawa, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 72 days.

(21) Appl. No.: 10/216,820

(22) Filed: Aug. 13, 2002

(65) Prior Publication Data

US 2003/0034464 A1 Feb. 20, 2003

(30) Foreign Application Priority Data

Aug. 14, 2001 (JP) ........................... 2001-246107
Apr. 24, 2002 (JP) ........................... 2002-121625

(51) Int. Cl.[7] ............................................. G01N 23/04
(52) U.S. Cl. .................................... 250/580; 250/581
(58) Field of Search ........................ 250/580, 581, 250/582, 583, 584, 585, 586, 587, 588, 589, 590, 591

(56) References Cited

U.S. PATENT DOCUMENTS

| 4,595,954 A | | 6/1986 | Endo et al. |
| 5,332,893 A | * | 7/1994 | Potts et al. ............... 250/208.1 |
| 5,821,540 A | | 10/1998 | Sato et al. |
| 6,590,224 B2 | * | 7/2003 | Imai ........................ 250/591 |
| 6,628,614 B2 | | 9/2003 | Okuyama et al. |
| 2001/0025935 A1 | * | 10/2001 | Ogawa ....................... 250/580 |
| 2002/0168198 A1 | * | 11/2002 | Imai ........................ 399/153 |
| 2003/0010942 A1 | * | 1/2003 | Kuwabara .................. 250/580 |
| 2003/0010943 A1 | * | 1/2003 | Imai ........................ 250/580 |

FOREIGN PATENT DOCUMENTS

| EP | 1 041 401 A2 | 4/2000 |
| EP | 1 041 400 A2 | 10/2000 |
| JP | 58087963 | 5/1983 |
| JP | 2000-284056 | 10/2000 |
| JP | 2000-284057 | 10/2000 |
| JP | 2000-105297 | 11/2000 |

* cited by examiner

Primary Examiner—David Porta
Assistant Examiner—Christine Sung
(74) Attorney, Agent, or Firm—Sughrue Mion, PLLC

(57) ABSTRACT

In a solid state radiation detector provided with a sub stripe electrode, an S/N ratio is improved. In an electrostatic recording medium, a first current detection circuit is connected to each line electrode of a stripe electrode and a second current detection circuit is connected to each line electrode of a sub stripe electrode. Upon retrieving an electrostatic latent image, electric currents flowing on the respective line electrodes are detected. In addition, signal synthesizing means synthesizes a signal detected by the first current detection circuit and a signal inverted from a signal detected by the second current detection circuit.

1 Claim, 3 Drawing Sheets

X-Z CROSS SECTION

X-Y CROSS SECTION

SOLID STATE RADIATION DETECTOR

BACKGROUND OF THE INVENTION

1. Field of the Invention

The present invention relates to a solid state radiation detector having an electric accumulator for accumulating electric charges, in an amount corresponding to either a dosage of irradiated radiation or luminous energy of light emitted by excitation of the radiation, as electric charges for a latent image.

2. Description of the Related Art

Presently, in the field of radiography for the purpose of medical diagnosis or the like, there are proposed various radiation image recording and retrieving apparatuses, each of which uses a solid state radiation detector (hereinafter simply referred to as a detector) provided with an electrostatic recording medium. The electrostatic recording medium accumulates electric charges obtained by detecting radiation in an electric accumulator as electric charges for a latent image, and the electric charges for a latent image thus accumulated are outputted after being converted into electric signals to represent radiation image information. Although various types of solid state radiation detectors for use in such apparatuses have been disclosed, a typical example is a detector adopting an optical readout mode for retrieving the accumulated electric charges by irradiating retrieving light (an electromagnetic wave for retrieval) onto the detector. Such a mode is adopted in terms of an electric-charge readout process for reading the accumulated electric charges outward.

In Japanese Unexamined Patent Publication Nos. 2000-105297, 2000-284056 and 2000-284057, there are disclosed solid state radiation detectors of an optical readout type, which is capable of striking a balance between a high-speed response upon readout and efficient retrieval of signal electric charges. The above-mentioned solid state radiation detectors refer to an electrostatic recording medium formed by stacking a first electrode having transmissivity with respect to light emitted by radiation for recording or by excitation of the radiation (such light will be hereinafter referred to as recording light); a recording photoconductive layer which takes on conductivity by receiving the recording light; a charge transport layer acting substantially as an insulator with respect to electric charges of the same polarity as the electric charges to be charged on the first electrode and acting substantially as a conductor with respect to electric charges of the reverse polarity to the electric charges of the same polarity; a retrieving photoconductive layer which takes on conductivity by receiving irradiation of retrieving light (an electromagnetic wave for retrieval); and a second electrode having transmissivity with respect to the retrieving light in the order described above, in which signal electric charges (electric charges for a latent image) carrying image information are accumulated in an electric accumulator formed on an interface between the recording photoconductive layer and the charge transport layer.

Moreover, especially in the above-mentioned Japanese Unexamined Patent Publication Nos. 2000-284056 and 2000-284057, there are disclosed electrostatic recording mediums, in which the second electrode having transmissivity with respect to the retrieving light is formed as a stripe electrode including multiple photoelectric charge pair generating line electrodes having transmissivity with respect to the retrieving light, and multiple photoelectric charge pair non-generating line electrodes are provided alternately with and mutually parallel to the photoelectric charge pair generating line electrodes in order to output electric signals at a level corresponding to an amount of the electric charges for a latent image being accumulated in the electric accumulator.

By providing the second electrode with a sub stripe electrode composed of the multiple photoelectric charge pair non-generating line electrodes as described above, a new capacitor is formed between the electric accumulator and the sub stripe electrode, whereby transported charges of the reverse polarity from the electric charges for a latent image accumulated in the electric accumulator by the recording light can be also charged on the sub stripe electrode owing to rearrangement of electric charges upon retrieval. In this way, it is possible to reduce an amount of the transported charges to be distributed to a capacitor formed between the stripe electrode and the electric accumulator via the retrieving photoconductive layer, so that it is relatively smaller as compared to a case where the sub stripe electrode is not provided. As a result, it is made possible to enhance retrieving efficiency by means of increasing an amount of signal electric charges extractable out of the detector, and to strike a balance between a high-speed response upon readout and efficient retrieval of the signal electric charges.

Incidentally, various modes have been disclosed for enhancing an S/N ratio of a detected signal in the electrostatic recording medium provided with the above-described sub stripe electrode.

For example, the amount of signal electric charges extractable outward is increased and the retrieval efficiency is thereby enhanced if the amount of the transported charges to be distributed to the capacitor formed between the sub stripe electrode and the electric accumulator via the retrieving photoconductive layer is larger than the amount of the transported charges to be distributed to the capacitor formed between the stripe electrode and the electric accumulator via the retrieving photoconductive layer. Accordingly, by setting a pair of a photoelectric charge pair generating line electrode and a photoelectric charge pair non-generating line electrode is defined as one cycle, there are disclosed various modes for enhancing the retrieving efficiency and thereby enhancing the S/N ratio, such as a mode of optimizing such a cycle or a mode of optimizing a ratio between a width of the photoelectric charge pair generating line electrode and a width of the photoelectric charge pair non-generating line electrode. However, further enhancement in the S/N ratio is still desired.

SUMMARY OF THE INVENTION

The present invention has been made in consideration of the foregoing circumstances. It is an object of the present invention to provide a solid state radiation detector including an electrostatic recording medium provided with a sub stripe electrode, which is capable of further enhancing an S/N ratio thereof.

A solid state radiation detector according to the present invention concerns a solid state radiation detector including an electrostatic recording medium formed by serially stacking a first electrode having transmissivity with respect to recording light, a recording photoconductive layer which takes on conductivity by receiving irradiation of the recording light, an electric accumulator for accumulating electric charges in an amount corresponding to luminous energy of the recording light as electric charges for a latent image, a retrieving photoconductive layer which takes on conductivity by receiving irradiation of retrieving light, and a second electrode provided with multiple photoelectric charge pair generating line electrodes having transmissivity with respect to the retrieving light and multiple photoelectric charge pair non-generating line electrodes in a manner that the photoelectric charge pair generating line electrodes and the photoelectric charge pair non-generating line electrodes are disposed alternately. Here, the solid state radiation detector includes means for detecting electric currents on the photoelectric charge pair generating line electrodes to be connected to the photoelectric charge pair generating line electrodes, means for detecting electric currents on the photoelectric charge pair non-generating line electrodes to be connected to the photoelectric charge pair non-generating line electrodes, and signal synthesizing means for synthesizing a signal detected by the means for detecting electric currents on the photoelectric charge pair generating line electrodes and a signal detected by the means for detecting electric currents on the photoelectric charge pair non-generating line electrodes while inverting any one of the foregoing signals.

Here, the foregoing "electrostatic recording medium" includes the first electrode, the recording photoconductive layer, the retrieving photoconductive layer and the second electrode being stacked in accordance with this order. Moreover, the electrostatic recording medium also includes the electric accumulator formed between the recording photoconductive layer and the retrieving photoconductive layer. Here, the electrostatic recording medium may be formed by additionally stacking other layers, minute conductive members (microplates), or the like. Moreover, the solid state radiation detector may be formed in any types as long as the solid state radiation detector can record image information as an electrostatic latent image by means of irradiating the light which carries radiation image information (the light generated by radiation or excitation of the radiation).

As for a method of forming the above-described electric accumulator, some applicable methods include a method of forming an electric accumulator by providing a charge transport layer and forming an electric accumulator on an interface between the charge transport layer and a recording photoconductive layer (see Japanese Unexamined Patent Publications No.2000-105297 and No. 2000-284056), a method of providing a trap layer and forming an electric accumulator within the trap layer or on an interface between the trap layer and a recording photoconductive layer (see specification of U.S. Pat. No. 4,535,468), a method of providing minute conductive members and the like for condensing and thereby accumulating electric charges for a latent image (see Japanese Unexamined Patent Publication No. 2000-284057), and the like.

Moreover, the foregoing "photoelectric charge pair generating line electrodes having transmissivity with respect to the retrieving light" refer to electrodes which transmit the retrieving light and thereby allows the retrieving light to generate charge pairs on the retrieving photoconductive layer. Moreover, the foregoing "photoelectric charge pair non-generating line electrodes" refer to electrodes for effectuating output of electric signals at a level corresponding to the amount of the electric charges for a latent image accumulated in the electric accumulator. It is preferred that the photoelectric charge pair non-generating line electrodes possess a light-shielding property against the retrieving light. However, the photoelectric charge pair non-generating line electrodes do not always have to possess a light-shielding property if a light-shielding film having a light-shielding property or the like is provided between the photoelectric charge pair non-generating line electrodes and retrieving light irradiating means. Here, the "light-shielding property" is not only limited to a property that shields against the retrieving light completely to not generate the charge pairs at all, but the light-shielding property may also include slight transmissivity with respect to the retrieving light so far as the charge pairs that are generated by such transmissivity are virtually insignificant. Therefore, the charge pairs to be generated on the retrieving photoconductive layer are not only limited to those attributable to the retrieving light which passes through the photoelectric charge pair generating line electrodes, but the charge pairs may be also generated on the retrieving photoconductive layer by the retrieving light which slightly passes through the photoelectric charge pair non-generating line electrodes.

Furthermore, it is satisfactory if the foregoing "retrieving light" can effectuate charge transfer in the electrostatic recording medium so as to read the electrostatic latent image electrically. To be more precise, light, radiation and the like are usable as the retrieving light.

According to the solid state radiation detector of the present invention, the signal detected by the means for detecting electric currents on the photoelectric charge pair generating line electrodes to be connected to the photoelectric charge pair generating line electrodes and the signal detected by the means for detecting electric currents on the photoelectric charge pair non-generating line electrodes to be connected to the photoelectric charge pair non-generating line electrodes are synthesized by the signal synthesizing means while inverting any one of the foregoing signals. In this event, the signal corresponding to the electric charges for a latent image to be detected by the means for detecting electric currents on the photoelectric charge pair generating line electrodes and the signal corresponding to the electric charges for a latent image to be detected by the means for detecting electric currents on the photoelectric charge pair non-generating line electrodes have substantially the same waveforms with reverse polarities from each other. Meanwhile, common-mode noises to be detected in common by both of the detecting means, the noises which are immixed owing to electromagnetic induction from a detection circuit itself, an external circuit, a power source or the like, have substantially the same waveforms with the same polarity to each other. Accordingly, if anyone of the signals is inverted and then synthesized with the other, the signal corresponding to the electric charges for a latent image is substantially doubled; meanwhile, the common-mode noises are offset and disappear. In the meantime, white noises $N_1$ and $N_2$ generated by an amplifier itself and detected by both of the detecting means are mutually flat within a certain bandwidth in terms of the frequency. Accordingly, if the white noises $N_1$ and $N_2$ of the same degrees are synthesized together (assuming that $N_1 \leq N_2 \leq N$), the aggregate white noise is magnified by about $\sqrt{2}$ times as shown in the following formula (1).

For this reason, it is possible to enhance the S/N ratio by $\sqrt{2}$ times or more by synthesizing the signal detected by the means for detecting electric currents on the photoelectric charge pair generating line electrodes and the signal detected by the means for detecting electric currents on the photoelectric charge pair non-generating line electrodes while inverting any one of the foregoing signals.

$$N_1+N_2=\sqrt{N_1^2+N_2^2}=\sqrt{2}\cdot N \quad (1)$$

DESCRIPTION OF THE PREFERRED EMBODIMENT

Figure 1A:
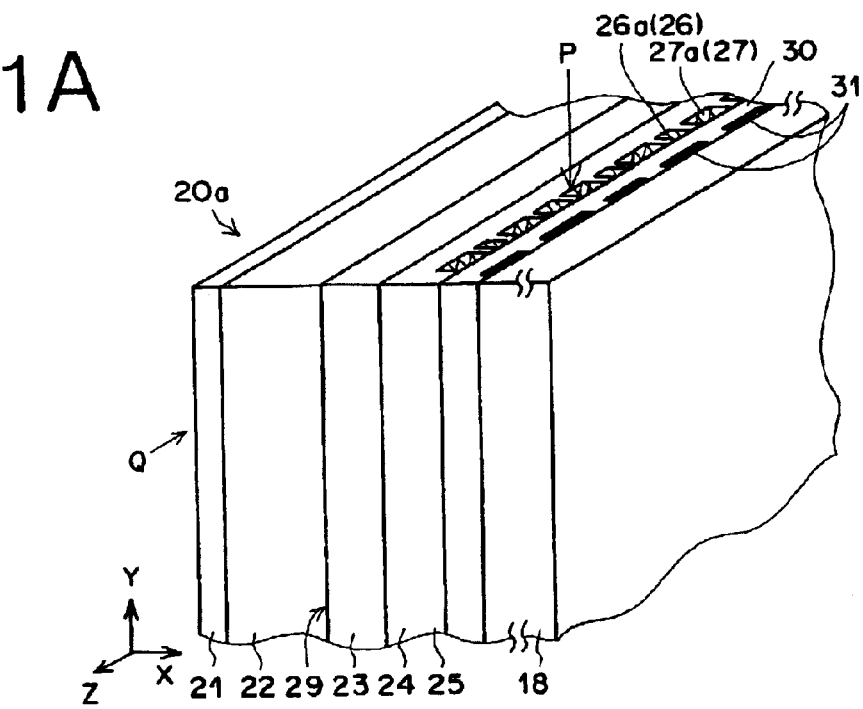
FIG. 1A is a perspective view of an electrostatic recording medium to be provided in a solid state radiation detector according to a first embodiment of the present invention.
Figure 1B:
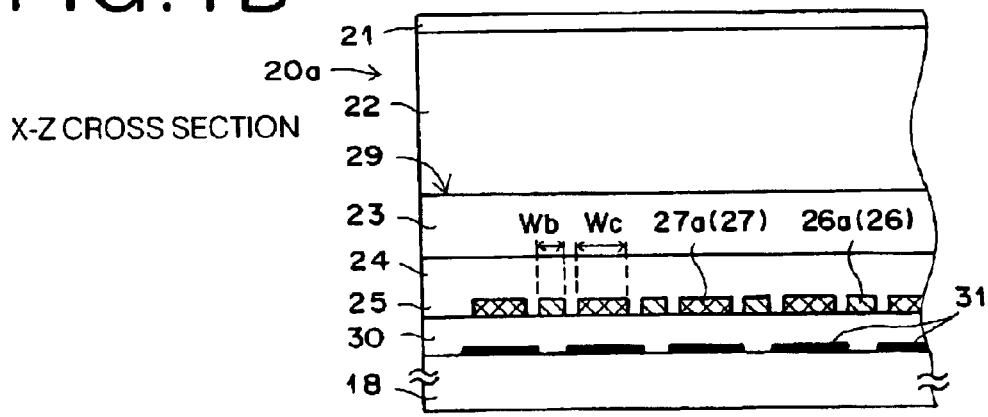
FIG. 1B is an X-Z cross-sectional view in a position indicated with an arrow Q in FIG. 1A.
Figure 1C:
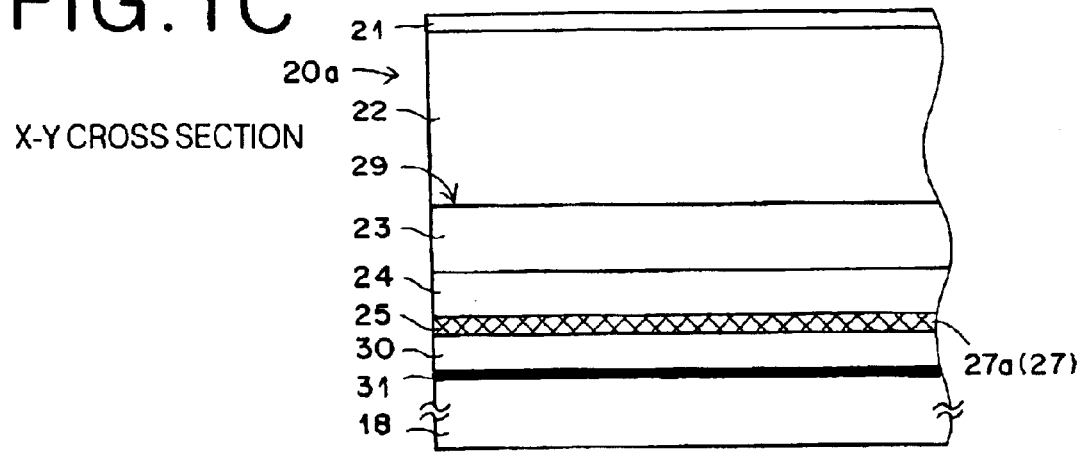
FIG. 1C is an X-Y cross-sectional view in a position indicated with an arrow P in FIG. 1A.
Figure 2A:
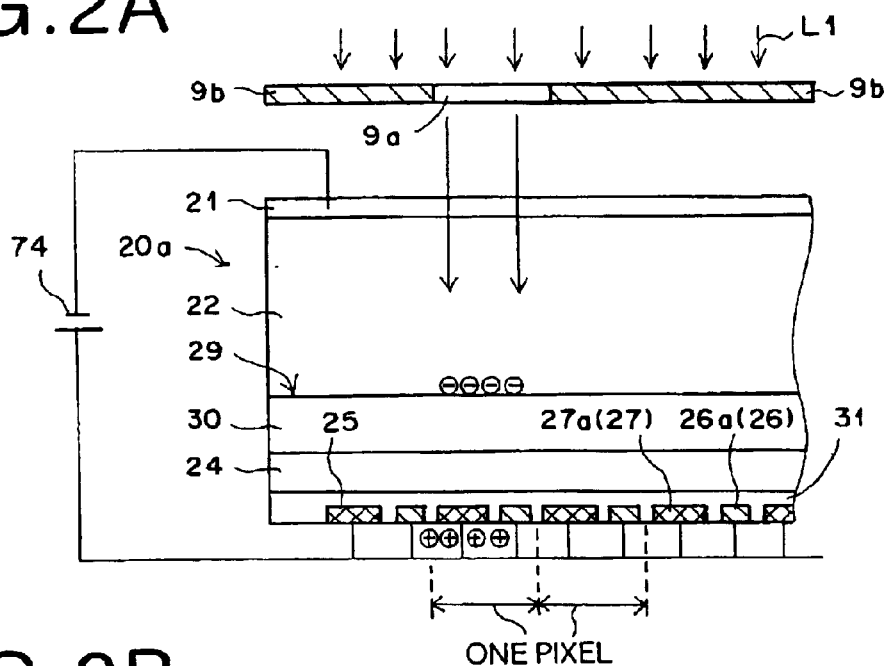
FIG. 2A is an electric charge model showing a process of recording an electrostatic latent image in the case of using the solid state radiation detector according to the first embodiment of the present invention.
Figure 2B:
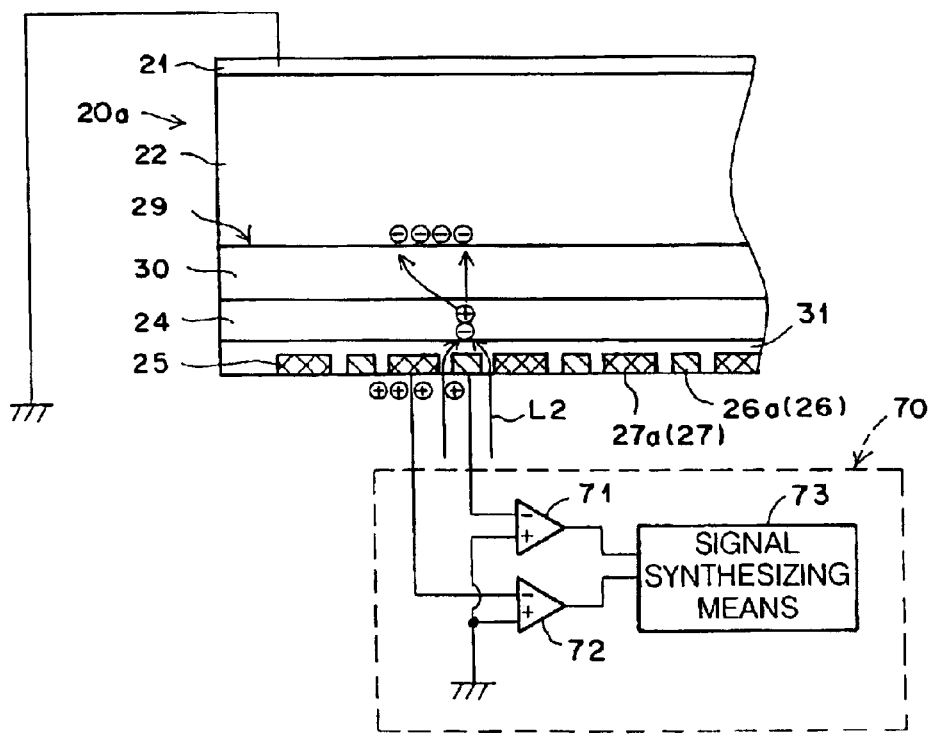
FIG. 2B is an electric charge model showing a process of retrieving the electrostatic latent image in the corresponding case.

Now, an embodiment of the present invention will be described with reference to the accompanying drawings. FIGS. 1A to 1C are views showing a schematic constitution of an electrostatic recording medium provided in a solid state radiation detector according to a first embodiment of the present invention. Specifically, FIG. 1A is a perspective view of an electrostatic recording medium 20a, FIG. 1B is an X-Z cross-sectional view of the electrostatic recording medium 20a in a position indicated with an arrow Q in FIG. 1A, and FIG. 1C is an X-Y cross-sectional view of the electrostatic recording medium 20a in a position indicated with an arrow P in FIG. 1A. FIGS. 2A and 2B are schematic views of a recording and retrieving system using the solid state radiation detector. Note that illustration of a support 18, an insulating layer 30 and a light-shielding layer 31 is omitted in FIGS. 2A and 2B.

The solid state radiation detector according to the first embodiment of the present invention includes the electrostatic recording medium 20a and signal detecting means 70.

The electrostatic recording medium 20a includes a first electrode 21 having transmissivity with respect to recording light (radiation or light generated by excitation of the radiation) carrying image information being composed of radiation such as X-rays transmitted through an imaging object, a recording photoconductive layer 22 which generates charge pairs and thereby takes on conductivity by receiving irradiation of the recording light transmitted through the first electrode 21, a charge transport layer 23 acting substantially as an insulator with respect to electric charges of a latent-image polarity (negative electric charges, for example) among the generated charge pairs and acting substantially as a conductor with respect to electric charges of a transport polarity (positive electric charges in the foregoing example) being reverse to the latent-image polarity, a retrieving photoconductive layer 24 which generates charge pairs and thereby takes on conductivity by receiving irradiation of retrieving light, a second electrode 25 provided with stripe electrodes 26 and sub stripe electrodes 27, the insulating layer 30 having transmissivity with respect to the retrieving light, and the support 18 having transmissivity with respect to the retrieving light. The electrostatic recording medium 20a is formed by stacking the foregoing constituents in the order described above. On an interface between the recording photoconductive layer 22 and the charge transport layer 23, a two dimensionally distributed electric accumulator 29 is formed for accumulating the electric charges of the latent-image polarity carrying the image information, which are generated inside the recording photoconductive layer 22.

For example, a glass substrate which transmits the retrieving light can be used as the support 18. Moreover, in addition to the transmissivity with respect to the retrieving light, it is preferable that the support 18 is made of a material having a thermal expansion coefficient which is relatively close to a thermal expansion coefficient of the material for the retrieving photoconductive layer 24. For example, if amorphous selenium (a-Se) is used as the retrieving photoconductive layer 24, then considering that the thermal expansion coefficient of selenium is defined as $3.68 \times 10^{-5}/K@40°$ C., it is preferred to use a material having a thermal expansion coefficient in a range from $1.0 \times 10^{-5}/K@40°$ C. to $10.0 \times 10^{-5}/K@40°$ C. It is more preferable to use a material having a thermal expansion coefficient in a range from $4.0 \times 10^{-5}/K@40°$ C. to $8.0 \times 10^{-5}/K@40°$ C. As materials with the thermal expansion coefficients in the above-mentioned range, organic polymer materials such as polycarbonate or polymethylmethacrylate (PMMA) can be used. In this way, the support 18 as a substrate and the retrieving photoconductive layer 24 (a Se film) match each other in thermal expansion. Accordingly, if the electrostatic recording medium 20a is subjected to a large heat cycle under a special circumstance, such as transportation in a vessel under a cold weather condition, the electrostatic recording medium 20a do not incur destructive problems attributable to a difference in the thermal expansion coefficients such as physical exfoliation of both of the members, tear of the retrieving photoconductive layer 24 or breakage of the support 18 by heat stress generated on an interface between the support 18 and the retrieving photoconductive layer 24. In addition, the organic polymer material has an impact-resistant advantage as compared to the glass substrate.

A material suitable for the recording photoconductive layer 22 is a photoconductive material including at least any one of amorphous selenium (a-Se), lead (II) oxide or lead (II) iodide such as PbO or $PbI_2$, $Bi_{12}(Ge,Si)O_{20}$, $Bi_2I_3$/organic polymer nanocomposite and the like, as a primary component thereof.

As a material for the charge transport layer 23, it is preferable that the material has a difference between mobility of the negative electric charges, for example, to be charged in the first electrode 21 and mobility of the positive electric charges of the reverse polarity as large as possible (such as $10^2$ or larger, preferably $10^3$ or larger). Materials suitable for the charge transport layer 23 include organic compounds such as poly(N-vinylcarbazole) (PVK), N,N'-diphenyl-N,N'-bis(3-methylphenyl)-(1,1'-biphenyl)-4,4'-diamine (TPD) and discotic liquid crystal, TPD polymer (polycarbonate, polystyrene, PVK) dispersions, or semiconductor materials such as a-Se doped with 10 to 20 ppm of Cl. In particular, the organic compounds (PVK, TPD, discotic liquid crystal and the like) are preferred they have light insensitive properties. In addition, since the organic compounds generally possess small permittivity, it is possible to reduce capacities of the charge transport layer 23 and the retrieving photoconductive layer 24, thus enhancing signal extraction efficiency upon retrieval. Note that the foregoing "light insensitive properties" refer to a phenomenon that the materials take on very little conductivity in spite of receiving irradiation of the recording light or the retrieving light.

A material suitable for the retrieving photoconductive layer 24 is a photoconductive material including at least any one of a-Se, Se—Te, Se—As—Te, nonmetal phthalocyanine, metal phthalocyanine, magnesium phthalocyanine (MgPc), phase II of vanadyl phthalocyanine (VoPc) and copper phthalocyanine (CuPc), as a primary component thereof.

A thickness of the recording photoconductive layer 22 is preferably set in a range from 50 μm to 1000 μm in order to absorb the recording light sufficiently.

Meanwhile, an aggregate thickness of the charge transport layer 23 and the retrieving photoconductive layer 24 is preferably set as ½ or less than the thickness of the recording photoconductive layer 22. Since responses upon retrieval are enhanced as the foregoing aggregate thickness becomes thinner, the aggregate thickness is preferably set to $\frac{1}{10}$ or less, more preferably to $\frac{1}{100}$ or less, and so forth.

Note that the foregoing materials for the respective layers are cited for one preferred example, in which the negative electric charges are charged on the first electrode 21 and the positive electric charges are charged on the second electrode 25 so as to accumulate the negative electric charges as the electric charges of the latent-image polarity on the electric accumulator 29 formed on the interface between the recording photoconductive layer 22 and the charge transport layer 23, and the charge transport layer 23 is made to function as a so-called positive-hole transport layer, wherein the mobility of the positive electric charges as the electric charges of the transport polarity is greater than the mobility of the negative electric charges as the electric charges of the latent-image polarity reverse to the transport polarity. However, each of the polarities of the electric charges described above maybe inverted. Only some modifications will be required for inverting the polarities, such as a modification from the charge transport layer functioning as the positive-hole transport layer to a charge transport layer functioning as an electron transport layer, and the like.

For example, the above-mentioned photoconductive materials such as amorphous selenium, lead (II) oxide or lead (II) iodide may be used as the recording photoconductive layer 22 similarly. Meanwhile, N-trinitrofluorenylidene aniline (TNFA) dielectrics, trinitrofluorenone (TNF)/polyester dispersoids, asymmetric diphenoquinone dielectrics are suitable for the charge transport layer 23. As for the retrieving photoconductive layer 24, the above-mentioned nonmetal phthalocyanine and metal phthalocyanine can be used similarly.

Moreover, in the above-described electrostatic recording medium 20a, the electric accumulator 29 is formed on the interface between the recording photoconductive layer 22 and the charge transport layer 23. However, the present invention is not limited to the foregoing, and the electric accumulator may be also formed as a trap layer for accumulating electric charges of the latent-image polarity as traps, as disclosed in U.S. Pat. No. 4,535,468, for example.

The first electrode 21 can be made of various materials so far as the material has transmissivity with respect to the recording light. For example, in order to provide the first electrode 21 with transmissivity with respect to visible light, publicly-known metal oxide materials such as a NESA film ($SnO_2$), indium tin oxide (ITO), or Idemitsu indium x-metal oxide (IDIXO; made by Idemitsu Kosan CO., Ltd.), which are easy-to-etch amorphous light-transmissive metal oxide, can be used in a thickness range from some 50 to 200 nm, preferably, at 100 nm or thicker. Otherwise, it is also possible to form a film with pure metal such as aluminum Al, gold Au, molybdenum Mo or chromium Cr in a thickness not exceeding 20 nm (preferably at some 10 nm) so as to impart transmissivity with respect to visible light. If X-rays are used as the recording light and an image is recorded by irradiating the X-rays from the first electrode 21 side, then transmissivity with respect to visible light is not necessary in the first electrode 21. Accordingly, pure metal such as Al or Au in a thickness at 100 nm, for example, can be used as the first electrode 21.

The second electrode 25 includes the stripe electrode 26 formed by arranging multiple photoelectric charge pair generating line electrodes 26a having transmissivity with respect to the retrieving light into stripes, and a sub stripe electrode 27 formed by arranging multiple photoelectric charge pair non-generating line electrodes 27a having a light-shielding property with respect to the retrieving light into stripes. The line electrodes 26a and 27a are arranged in a manner that each line electrode 26a and each line electrode 27a are disposed alternately and in parallel. Part of the retrieving photoconductive layer 24 lies between the line electrodes 26a and the line electrodes 27a, whereby the stripe electrode 26 and the stripe electrode 27 are electrically insulated with each other. The sub stripe electrode 27 is a conductive member for outputting electric signals in an amount corresponding to an amount of the electric charges for a latent image accumulated in the electric accumulator 29 to be formed on the interface between the recording photoconductive layer 22 and the charge transport layer 23.

Here, as the material for electrode members constituting the respective line electrodes 26a of the stripe electrode 26, indium tin oxide (ITO), Idemitsu indium x-metal oxide (IDIXO; made by Idemitsu Kosan CO., Ltd.), aluminum, molybdenum or the like can be used. Meanwhile, as the material for electrode members constituting the respective line electrodes 27a of the sub stripe electrode 27, aluminum, molybdenum, chromium or the like can be used.

Moreover, light-shielding films 31 made of members with an inferior light-transmissive property are provided on the support 18 in positions corresponding to the respective line electrodes 27a and spaces between the line electrodes 26a and the line electrodes 27a, so that irradiation intensity of the retrieving light onto the line electrodes 27a is reduced as compared with irradiation intensity of the light onto the line electrodes 26a.

The material for the light-shielding films 31 does not have to possess an absolute insulative property, and a material having resistance of $2 \times 10^{-6}$ or above (more preferably $1 \times 10^{15}$ Ω·cm or less) can be used as the light-shielding films 31. For example, metallic materials such as Al, Mo or Cr, and organic materials such as $MoS_2$, $WSi_2$ or TiN can be used. It is more preferable if a material having resistance of 1Ω·cm or more is used as the light-shielding films 31.

When a conductive material such as a metallic material is used as the member of the light-shielding films 31, it is at least necessary to provide an insulating material between the light-shielding films 31 and the line electrodes 27a in order to avoid direct contact of both of the members. The electrostatic recording medium 20a of the embodiment includes an insulating film 30 between the second electrode 25 and the support 18, which is made of $SiO_2$ or the like. A thickness of the insulating film 30 is preferably set in a range from about 0.01 μm to 10 μm, more preferably in a range from 0.1 μm to 1 μm, or most preferably at about 0.5 μm.

The signal detecting means 70 includes current detection circuits (means for detecting electric currents on the photoelectric charge pair generating line electrodes) 71 connected to the respective photoelectric charge pair generating line electrodes 26a, current detection circuits (means for detecting electric currents on the photoelectric charge pair non-generating line electrodes) 72 connected to the respective photoelectric charge pair non-generating line electrodes 27a, and signal synthesizing means 73 to which the current detection circuits 71 and the current detection circuits 72 are connected.

The current detection circuits 71 and 72 are electric circuits for detecting electric currents flowing on the respective line electrodes connected thereto.

The signal synthesizing means 73 synthesizes signals detected by the current detection circuits 71 and signals inverted from signals detected by the current detection circuits 72. Needless to say, the signal synthesizing means 73 may synthesize signals inverted from the signals detected by the current detection circuits 71 and the signals detected by the current detection circuits 72, alternatively.

Next, description will be made briefly regarding basic modes of recording image information on the above-described electrostatic recording medium 20*a* as an electrostatic latent image, and of retrieving the recorded electrostatic latent image. FIGS. 2A and 2B are schematic views of a recording and retrieving system using the electrostatic recording medium 20*a*.

The recording and retrieving system includes the electrostatic recording medium 20*a*, recording light irradiating means (not shown), the signal detecting means 70 as image signal obtaining means, and retrieving light scanning means (not shown).

Next, description will be made regarding an operation of recording image information on the electrostatic recording medium 20*a* as an electrostatic latent image by use of the recording and retrieving system of the above-described constitution, and an operation of retrieving the recorded electrostatic latent image. First, a process of recording an electrostatic latent image will be described with reference to an electric charge model shown in FIG. 2A. Note that negative electric charges (−) and positive electric charges (+) generated inside the recording photoconductive layer 22 by recording light L1 are illustrated with circled "−" signs or "+" signs in the drawing, respectively.

Upon recording an electrostatic latent image on the electrostatic recording medium 20*a*, a direct-current voltage is applied between the first electrode 21 and the stripe electrode 26 as well as between the first electrode 21 and the sub stripe electrode 27 to charge both the stripe electrode 26 and the sub stripe electrode 27. In this event, if the stripe electrode 26 and the sub stripe electrode 27 are set to the same electric potential by applying a controlled voltage, it is possible to form uniform distribution of an electric field between the first electrode 21 and the second electrode 25. In this embodiment, the stripe electrode 26 and the sub stripe electrode 27 are set to grounded potential upon recording and also upon retrieval.

Next, a radiation is irradiated on an imaging object 9, whereby the recording light L1, which passes through a transmissive portion 9*a* of the imaging object 9 and thereby carries radiation image information of the imaging object 9, is irradiated onto the electrostatic recording medium 20*a*. Then, positive and negative charge pairs are generated inside the recording photoconductive layer 22 of the electrostatic recording medium 20*a*, and negative electric charges out of the charge pairs move toward the electric accumulator 29 in accordance with the distribution of an electric field inside the electrostatic recording medium 20*a*.

Meanwhile, positive electric charges generated inside the recording photoconductive layer 22 move toward the first electrode 21 rapidly and are re-coupled with negative electric charges injected from a power source 74 to an interface between the first electrode 21 and the recording photoconductive layer 22, whereby the positive electric charges eventually disappear. On the contrary, since the recording light L1 does not pass through light-shielding portions 9*b* of the imaging object 9, portions of the electrostatic recording medium 20*a* under the light-shielding portions 9*b* do not change at all.

In this way, electric charges corresponding to an image of the imaging object can be accumulated on the electric accumulator 29 on the interface between the photoconductive layer 22 and the charge transport layer 23 by irradiating the recording light L1 onto the imaging object 9. An amount of the electric charges for a latent image (the negative electric charges) thus accumulated is substantially proportional to a dosage of the radiation which transmitted through the imaging object 9 and made incident onto the electrostatic recording medium 20*a*. Accordingly, the electric charges for a latent image carry an electrostatic latent image, and the electrostatic latent image is thereby recorded on the electrostatic recording medium 20*a*.

Next, upon retrieval of the electrostatic latent image out of the electrostatic recording medium 20*a*, the first electrode 21 is set to grounded potential and the entire surface of the electrostatic recording medium 20*a* is scan-exposed with linear retrieving light L2 by moving the retrieving light irradiating means in the longitudinal direction of the line electrodes 26*a*, that is, by sub-scanning. Positive and negative charge pairs are generated inside the retrieving photoconductive layer 24 in positions corresponding to sub-scanning positions where the retrieving light L2 is made incident by scanning exposure of the retrieving light L2.

Then, the electric charges for a latent image in positions corresponding to the line electrodes 27*a*, that is, in positions above the line electrodes 27*a*, are serially retrieved via the line electrodes 27*a*. In other words, as shown in FIG. 2B, electric discharge occurs from the line electrode 26*a* toward the electric charges for a latent image corresponding to (present above) the line electrode 27*a* adjacent to the corresponding line electrode 26*a*, whereby retrieval progresses.

In this event, the electric currents flowing on the line electrode 26*a* and the line electrode 27*a* are detected by the current detection circuit 71 and by the current detection circuit 72, respectively, and a signal detected by the current detection circuit 71 and a signal inverted from a signal detected by the current detection circuit 72 are synthesized by the signal synthesizing means 73. Therefore, as described previously, an aggregate signal corresponding to the electric charges for a latent image is substantially doubled; meanwhile, common-mode noises generated by electromagnetic induction or the like are off set and thereby disappear. In the meantime, aggregate white noise generated by amplifiers or the like is magnified by about $\sqrt{2}$ times. As a result, an S/N ratio in the embodiment is improved by about $\sqrt{2}$ times or more than the conventional art. Note that it is preferred in terms of the S/N ratio that the signal synthesizing means adopts analog procedures. However, the S/N ratio can be also improved if the signal is converted into a digital value and then processed with hardware or software.

The present invention can achieve the best effects when the amplitude of the signal inputted from the current detection circuit 71 to the signal synthesizing means 73 is equal to the amplitude of the signal inputted from the current detection circuit 72 to the signal synthesizing means 73.

In order to achieve the foregoing condition, it is preferable that electrical resistance from a signal output of the line electrode 26*a* to the signal synthesizing means 73 is set substantially equal to electrical resistance from a signal output of the line electrode 27*a* to the signal synthesizing means while considering presence of slight electrical resistance on each line electrode and on each line from the line electrode to the signal synthesizing means 73.

Figure 3A:
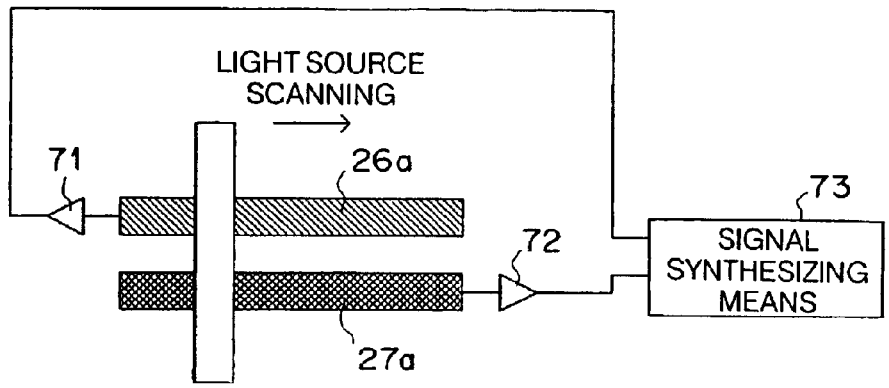
FIGS. 3A, 3B and 3C are schematic views each showing a second electrode and signal detecting means of the solid state radiation detector according to the first embodiment of the present invention.
Figure 3B:
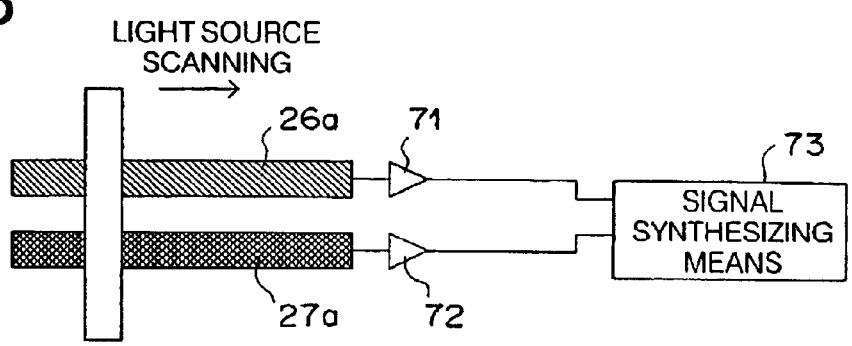

Such electrical resistance varies according to the material, the length, the width and the like of each line. If all the lines are made of the same material in the same size while the length from the signal output of the line electrode 26a to the signal synthesizing means 73 and the length from the signal output of the line electrode 27a to the signal synthesizing means 73 are made different as shown in FIG. 3A, then electrical resistance varies between the two lines. Therefore, as shown in FIG. 3B, it is preferable to set the length from the signal output of the line electrode 26a to the signal synthesizing means 73 substantially as equal to the length from the signal output of the line electrode 27a to the signal synthesizing means 73.

To be more precise, the signal from the photoelectric charge pair non-generating line electrode 27a contains an electric current bypassing through the first electrode 21. As a consequence, the amplitude of the signal from the line electrode 27a becomes slightly smaller even if the lengths of the line from the signal outputs of the respective line electrodes to the signal synthesizing means 73 are set substantially equal as shown in FIG. 3B.

Figure 3C:
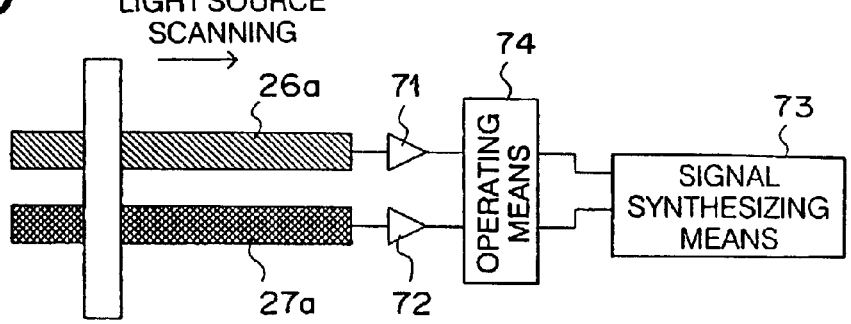

Therefore, as shown in FIG. 3C, operating means 74 is provided between the current detection circuit 71 and the current detection circuit 72, and the signal synthesizing means 73. It is possible to achieve a better effect by means of equalizing the amplitude of the signal inputted from the current detection circuit 71 and the amplitude of the signal inputted from the current detection circuit 72 with the operating means 74 and then inputting the equalized signals to the signal synthesizing means 73. Concerning an operation of equalizing two amplitude values between the signals, the signal with lower amplitude may be amplified so as to match the signal with higher amplitude, or the signal with higher amplitude may be attenuated so as to match the signal with lower amplitude.

Description has been made regarding a preferred embodiment of a solid state radiation detector according to the present invention. However, it is to be understood that the present invention is not limited to the above-described specific embodiment, and various modifications will be possible without departing from the spirit and scope of the present invention.

For example, in the detector according to the embodiment, the recording photoconductive layer takes on conductivity by irradiation of a radiation for recording. However, the photoconductive layer of the detector according to the present invention is not limited to the foregoing type, and the recording photoconductive layer may be formed to take on conductivity by irradiation of light generated by excitation of the radiation for recording (see Japanese Unexamined Patent Publication No. 2000-105297). In such a case, a wavelength-converting layer for converting the radiation for recording into light having another wavelength such as blue light may be deposited on a surface of the first electrode. Such a wavelength-converting layer is so-called an X-ray scintillator. As for the wavelength-converting layer, cesium iodide (CsI) is preferably used, for example. In this case, the first electrode is required to have transmissivity with respect to light emitted from the wavelength-converting layer by excitation of the radiation for recording.

Moreover, in the electrostatic recording medium according to the embodiment, the charge transport layer is provided between the recording photoconductive layer and the retrieving photoconductive layer and the electric accumulator is formed on the interface between the recording photoconductive layer and the charge transport layer. However, the charge transport layer may be substituted by a trap layer. If the trap layer is adopted, the electric charges for a latent image are trapped by the trap layer, whereby the electric charges for a latent image are accumulated inside the trap layer or on an interface between the trap layer and the recording photoconductive layer. Moreover, microplates may be also provided on the interface between the trap layer and the recording photoconductive layer individually for the respective pixels.

What is claimed is:

1. A solid state radiation detector provided with an electrostatic recording medium formed by serially stacking a first electrode having transmissivity with respect to recording light, a recording photoconductive layer which takes on conductivity by receiving irradiation of the recording light, an electric accumulator for accumulating electric charges in an amount corresponding to luminous energy of the recording light as electric charges for a latent image, a retrieving photoconductive layer which takes on conductivity by receiving irradiation of retrieving light, and a second electrode provided with multiple photoelectric charge pair generating line electrodes having transmissivity with respect to the retrieving light and multiple photoelectric charge pair non-generating line electrodes in a manner that the photoelectric charge pair generating line electrodes and the photoelectric charge pair non-generating line electrodes are disposed alternately, the solid state radiation detector comprising:

means for detecting electric currents on the photoelectric charge pair generating line electrodes to be connected to the photoelectric charge pair generating line electrodes;

means for detecting electric currents on the photoelectric charge pair non-generating line electrodes to be connected to the photoelectric charge pair non-generating line electrodes; and signal synthesizing means for synthesizing a signal detected by the means for detecting electric currents on the photoelectric charge pair generating line electrodes and a signal detected by the means for detecting electric currents on the photoelectric charge pair non-generating line electrodes while inverting any one of the foregoing signals.

* * * * *